US012723550B2

(12) United States Patent
Saito

(10) Patent No.: US 12,723,550 B2
(45) Date of Patent: Sep. 1, 2026

(54) VEHICLE

(71) Applicant: SUBARU CORPORATION, Tokyo (JP)

(72) Inventor: Takeshi Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/236,072

(22) Filed: Jun. 12, 2025

(65) Prior Publication Data

US 2026/0028943 A1 Jan. 29, 2026

(30) Foreign Application Priority Data

Jul. 25, 2024 (JP) ................................ 2024-120658

(51) Int. Cl.
*F02D 33/02* (2006.01)
*F02D 35/00* (2006.01)

(52) U.S. Cl.
CPC ......... *F02D 33/02* (2013.01); *F02D 35/0007* (2013.01)

(58) Field of Classification Search
CPC ............................ F02D 35/0007; F02D 33/02
See application file for complete search history.

(56) References Cited

U.S. PATENT DOCUMENTS

| | | | | |
|---|---|---|---|---|
| 7,933,711 | B1 * | 4/2011 | Ulrey | F02D 41/065 123/406.47 |
| 2014/0195128 | A1 | 7/2014 | Tsumori | |
| 2018/0134272 | A1 * | 5/2018 | Doering | B60K 6/547 |
| 2020/0277908 | A1 * | 9/2020 | Glugla | F16H 61/0213 |

FOREIGN PATENT DOCUMENTS

WO 2013/021429 A1 2/2013

* cited by examiner

*Primary Examiner* — Kevin A Lathers
(74) *Attorney, Agent, or Firm* — Rimon P.C.

(57) ABSTRACT

A vehicle includes an engine, an intake manifold, a starter motor, a battery, and a control apparatus. The intake manifold is coupled to the engine. The starter motor is configured to start up the engine. The battery is configured to drive the starter motor. The control apparatus includes one or more processors, and one or more memories coupled to the one or more processors. The one or more processors are configured to execute idle reduction control, and execute, during execution of the idle reduction control and before cancelling the idle reduction control, adjustment control of adjusting an internal pressure of the intake manifold and causing the internal pressure of the intake manifold to be lower as a voltage of the battery is lower.

8 Claims, 4 Drawing Sheets

VEHICLE

CROSS-REFERENCE TO RELATED APPLICATIONS

The present application claims priority from Japanese Patent Application No. 2024-120658 filed on Jul. 25, 2024, the entire contents of which are hereby incorporated by reference.

BACKGROUND

The disclosure relates to a vehicle.

A vehicle has been widely used in which idle reduction control is executed with the aim of reducing exhaust gas, reducing noise, improving fuel consumption, etc. For example, reference is made to International Publication No. WO 2013/021429. The idle reduction control is a control that automatically stops an engine when the vehicle temporarily stops. Thereafter, the engine is restarted when a condition for cancelling the idle reduction control is satisfied. In this case, the engine is restarted by a starter motor.

SUMMARY

An aspect of the disclosure provides a vehicle including an engine, an intake manifold, a starter motor, a battery, and a control apparatus. The intake manifold is coupled to the engine. The starter motor is configured to start up the engine. The battery is configured to drive the starter motor. The control apparatus includes one or more processors, and one or more memories coupled to the one or more processors. The one or more processors are configured to execute idle reduction control, and execute, during execution of the idle reduction control and before cancelling the idle reduction control, adjustment control of adjusting an internal pressure of the intake manifold and causing the internal pressure of the intake manifold to be lower as a voltage of the battery is lower.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
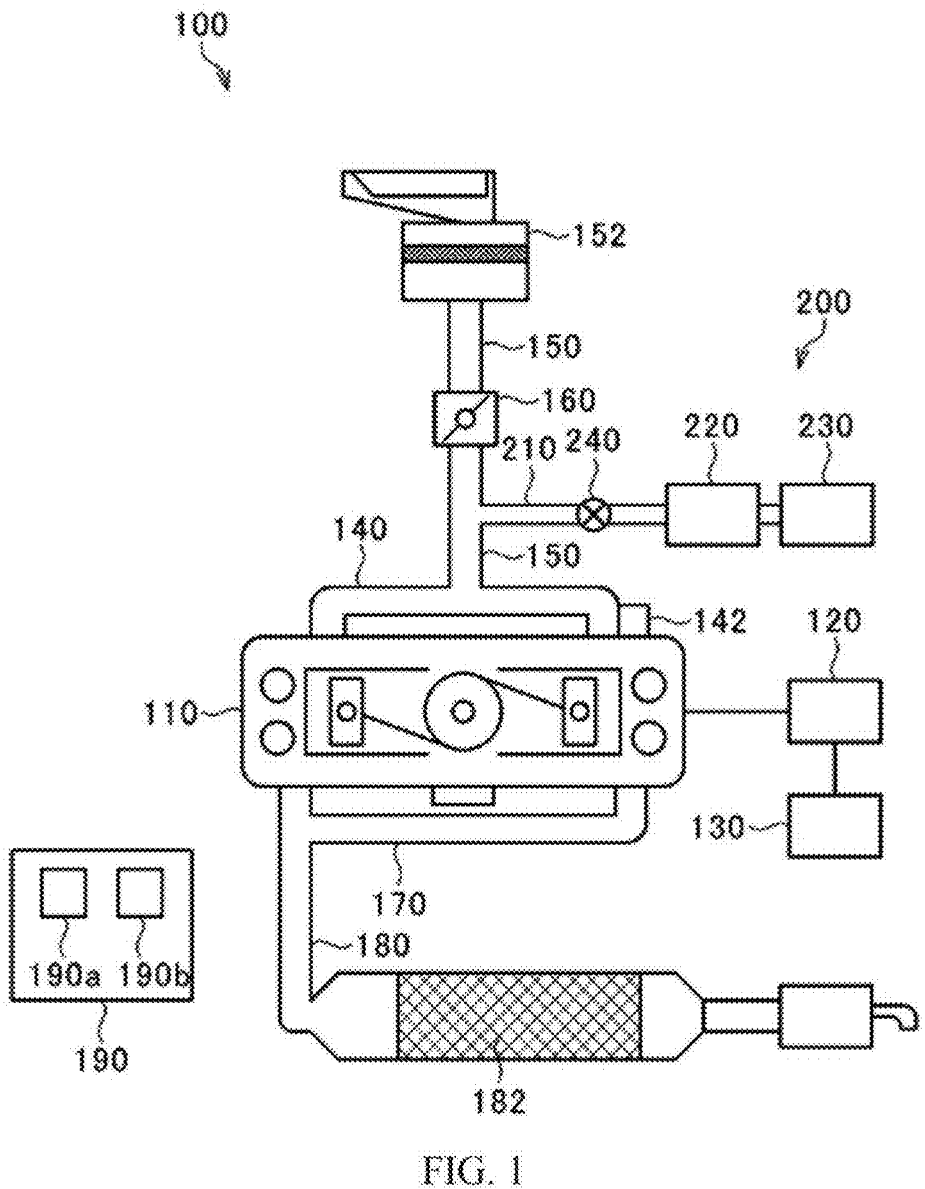
FIG. 1 is a schematic diagram illustrating an outline configuration of a vehicle according to one example embodiment of the disclosure.

When a voltage of electric power supplied to a starter motor becomes lower due to a factor such as deterioration of a battery, it is sometimes difficult for a torque of the starter motor to overcome a frictional resistance of an engine and a rotational resistance that occurs in a compression stroke. This can lead to a possibility that the starter motor fails to normally execute cranking and thus restarting of the engine is not appropriately executable.

It is desirable to provide a vehicle that makes it possible to appropriately execute a startup of an engine when idle reduction control is cancelled.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

<Configuration of Vehicle>

An exemplary configuration of a vehicle 100 according to an example embodiment of the disclosure will now be described with reference to FIG. 1. FIG. 1 schematically illustrates an outline configuration of the vehicle 100 according to the example embodiment. Referring to FIG. 1, the vehicle 100 may include, for example, an engine 110, a starter motor 120, a battery 130, an intake manifold 140, an intake flow passage 150, a throttle valve 160, an exhaust manifold 170, an exhaust flow passage 180, and a control apparatus 190.

The engine 110 may serve as a driving source of the vehicle 100. The vehicle 100 may thus be an engine vehicle. The engine 110 may be a gasoline engine or a diesel engine. The vehicle 100 may be a hybrid vehicle including a motor as a driving source, in addition to the engine 110. The engine 110 may include multiple cylinders, for example.

The starter motor 120 starts up the engine 110. The battery 130 drives the starter motor 120. The battery 130 may be an auxiliary battery, for example.

The intake manifold 140 may be coupled to an intake port provided at each cylinder of the engine 110. The intake manifold 140 may be provided with a pressure sensor 142 that detects an internal pressure of the intake manifold 140.

The intake flow passage 150 may be coupled to a collector of the intake manifold 140. The intake flow passage 150 may be provided with an air cleaner 152, for example. The air cleaner 152 may remove foreign matter included in air taken into the intake flow passage 150.

The intake flow passage 150 may be further provided with the throttle valve 160 disposed downstream of the air cleaner 152. The throttle valve 160 may adjust a flow rate of intake air to be sent to the engine 110 through the intake flow passage 150. The flow rate of the intake air to be sent to the engine 110 may vary depending on an opening degree of the throttle valve 160.

The exhaust manifold 170 may be coupled to an exhaust port provided at each cylinder of the engine 110. The exhaust flow passage 180 may be coupled to a collector of the exhaust manifold 170. The exhaust flow passage 180 may be provided with a purifier 182, for example. The purifier 182 may purify exhaust gas discharged from the engine 110. The purifier 182 may include, for example, a catalyst, a filter, or both. The catalyst may include, for example, one or more of an oxidation catalyst, a three-way catalyst, and an NOx storage and reduction catalyst. The filter may trap particulate matter, such as soot, included in the exhaust gas. The filter may be a gasoline particulate filter (GPF) or a diesel particulate filter (DPF), for example.

The control apparatus 190 includes one or more processors 190*a*, and one or more memories 190*b* coupled to the one or more processors 190*a*. The one or more processors 190*a* may each include a central processing unit (CPU), for example. The one or more memories 190*b* may each include a read only memory (ROM) or a random access memory (RAM), for example. The ROM may be a storage device that holds data such as programs and operation parameters to be used by the CPU. The RAM may be a storage device that temporarily holds data such as variables and parameters usable for processing to be executed by the CPU. Details of the control apparatus 190 will be described later.

In the example embodiment, the vehicle 100 may include an evaporative fuel processor 200. The evaporative fuel processor 200 may also be called an evaporative emission control system. The evaporative fuel processor 200 may prevent fuel gas evaporating from a fuel tank or other containers provided in the vehicle 100 from being emitted to the atmosphere. The evaporative fuel processor 200 may include a first flow passage 210, a canister 220, a suction device 230, and an opening degree adjustment valve 240, for example.

The first flow passage 210 may be coupled to the intake flow passage 150. The first flow passage 210 may communicate with the intake manifold 140 via the intake flow passage 150.

The canister 220 may be provided in the first flow passage 210. The canister 220 may store the fuel gas evaporating from the fuel tank or other containers. The canister 220 may include activated carbon, for example.

The suction device 230 may be provided at a location, in the first flow passage 210, farther from the intake manifold 140 with respect to the canister 220. The suction device 230 may suction gas from the intake manifold 140 toward the first flow passage 210. The suction device 230 may be included in an evaporative leak check module (ELCM), for example. The ELCM may check a fuel gas leak from the fuel tank. The suction device 230 may include a pump, for example.

The opening degree adjustment valve 240 may be provided at a location, in the first flow passage 210, closer to the intake manifold 140 with respect to the canister 220. The opening degree adjustment valve 240 may adjust a passage cross-sectional area of the first flow passage 210. The opening degree adjustment valve 240 may be a solenoid valve, for example.

The control apparatus 190 may communicate with each of devices provided in the vehicle 100, including the engine 110, the throttle valve 160, the starter motor 120, the battery 130, the pressure sensor 142, the suction device 230, and the opening degree adjustment valve 240. The communication between the control apparatus 190 and each of the devices may be established via a communication network such as a controller area network (CAN).

Figure 2:
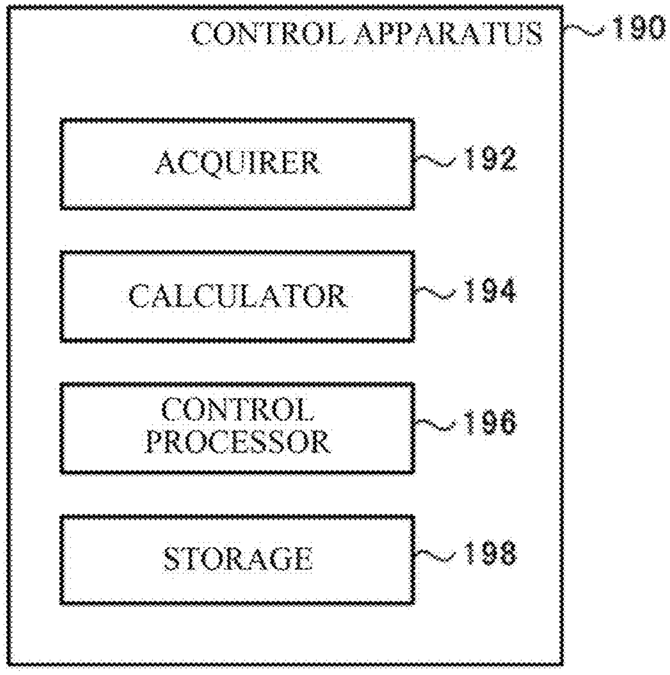
FIG. 2 is a block diagram illustrating an exemplary configuration of a control apparatus illustrated in FIG. 1.

FIG. 2 is a block diagram illustrating an exemplary configuration of the control apparatus 190 of the example embodiment. Referring to FIG. 2, the control apparatus 190 may include an acquirer 192, a calculator 194, a control processor 196, and a storage 198, for example. Various kinds of processing including later-described processes to be performed by one or more of the acquirer 192, the calculator 194, and the control processor 196 may be executed by the one or more processors 190*a*. For example, the various kinds of processing may be executed when the one or more processors 190*a* carry out the programs stored in the one or more memories 190*b*. Functionality of the storage 198 may be implemented by the one or more memories 190*b*.

The acquirer 192 may acquire various kinds of data to be used in the process or processes to be performed by the calculator 194, the control processor 196, or both, and may send the data to the calculator 194, the control processor 196, or both. For example, the acquirer 192 may acquire data such as data on a voltage from the battery 130. In some embodiments, the acquirer 192 may acquire data from the engine 110, the pressure sensor 142, the canister 220, or other devices or components.

The calculator 194 may calculate, during execution of idle reduction control and before cancelling the idle reduction control, a target internal pressure of the intake manifold 140 based on the voltage of the battery 130. Details of the process to be performed by the calculator 194 will be described later.

The control processor 196 may control an operation of each device provided in the vehicle 100. In the example embodiment, the control processor 196 may control the engine 110 to thereby execute the idle reduction control. The idle reduction control may be a control that stops the engine when the vehicle 100 temporarily stops.

In the example embodiment, the control processor 196 executes adjustment control during the execution of the idle reduction control. The adjustment control adjusts the internal pressure of the intake manifold 140. This helps to allow the vehicle 100 according to the example embodiment to appropriately execute a startup of the engine 110 when cancelling the idle reduction control. Details of the adjustment control to be executed by the control processor 196 will be described later.

The storage 198 may hold target internal pressure data, for example. The target internal pressure data may be data in which the voltage of the battery 130, a frictional resistance of the engine 110, and the target internal pressure of the intake manifold 140 are associated with each other.

A torque of the starter motor 120 may depend on the voltage of the battery 130. As the voltage of the battery 130 becomes lower, a voltage of electric power supplied to the starter motor 120 may also become lower. The frictional resistance of the engine 110 may be a resistance caused by friction occurring upon rotation of the engine 110, and may also be called friction. The frictional resistance of the engine 110 may depend on factors including a temperature of lubricating oil circulating through the engine 110 and a temperature of cooling water circulating through the engine 110. The internal pressure of the intake manifold 140 may be related to a rotational resistance occurring in a compression stroke. As the internal pressure of the intake manifold 140 becomes lower, the rotational resistance also becomes lower.

In the target internal pressure data, the frictional resistance of the engine 110 and the voltage of the battery 130 may be associated with the target internal pressure of the intake manifold 140 that allows the engine 110 to rotate under such a frictional resistance of the engine 110 and at such a voltage of the battery 130.

As described above, as the voltage of the battery 130 becomes lower, the voltage of the electric power supplied to the starter motor 120 may also become lower. As the voltage of the electric power supplied to the starter motor 120 becomes lower, the torque of the starter motor 120 may decrease. As the torque of the starter motor 120 decreases, the frictional resistance and the rotational resistance of the engine 110 that the torque is able to overcome may decrease. Accordingly, in the target internal pressure data, the target internal pressure of the intake manifold 140 may be set to be lower as the voltage of the battery 130 is lower.

The functionality of the control apparatus 190 according to the example embodiment may be implemented by multiple devices, or multiple functionalities of the control apparatus 190 may be implemented by a single device. When the functionality of the control apparatus 190 is implemented by multiple devices, the devices may be coupled to each other via a communication bus such as a CAN.

2. Operation of Control Apparatus

An exemplary operation of the control apparatus 190 according to the example embodiment of the disclosure will now be described with reference to FIG. 3.

Figure 3:
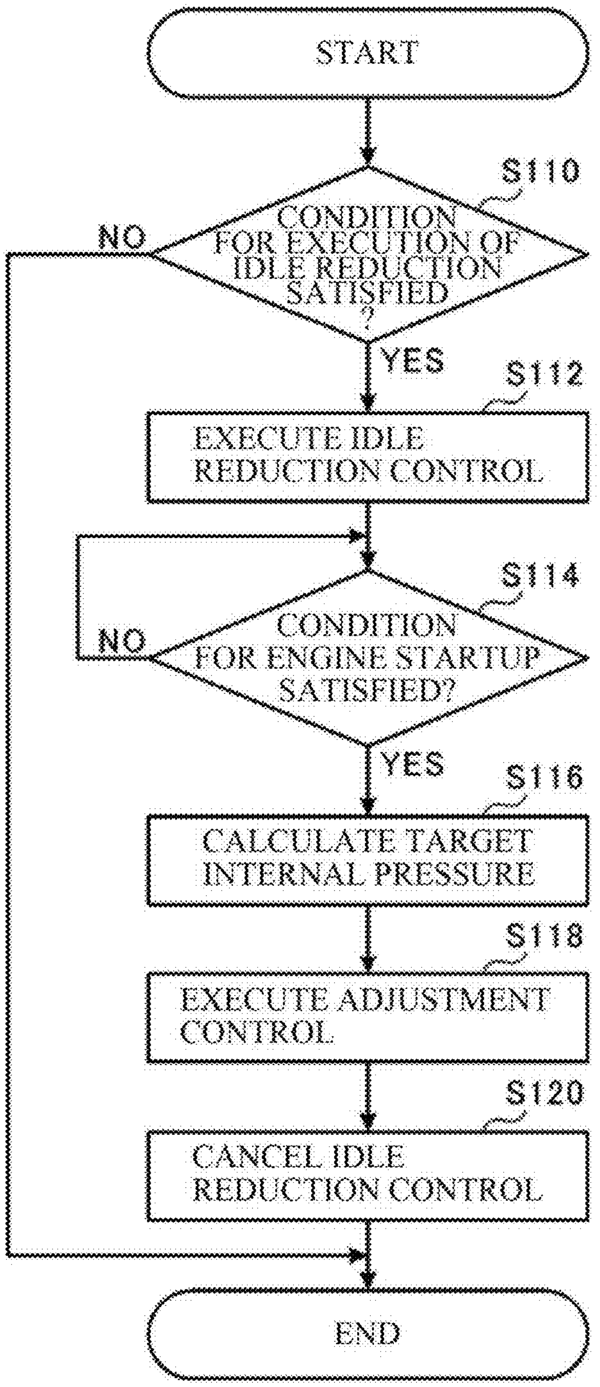
FIG. 3 is a flowchart illustrating an exemplary idle reduction process to be performed by the control apparatus illustrated in FIG. 1.

FIG. 3 is a flowchart illustrating an exemplary idle reduction process to be performed by the control apparatus 190 according to the example embodiment.

Referring to FIG. 3, in step S110, the control processor 196 may determine whether a condition for execution of idle reduction is satisfied. The control processor 196 may determine that the condition for execution of idle reduction is satisfied, for example, when: an ignition is on; a vehicle speed detected by an unillustrated vehicle speed sensor is less than a vehicle speed threshold; an unillustrated brake pedal is held down; and an accelerator position of an unillustrated accelerator pedal is less than a position threshold. If the control processor 196 determines that the condition for execution of idle reduction is satisfied (YES in step S110), the control processor 196 may cause the process to proceed to step S112. If the control processor 196 determines that the condition for execution of idle reduction is unsatisfied (NO in step S110), the control processor 196 may end the idle reduction process.

In step S112, the control processor 196 may execute the idle reduction control. As the idle reduction control, the control processor 196 may stop injection of fuel to the engine 110 and thereby stop the engine 110. To reduce the internal pressure of the intake manifold 140 in the example embodiment, the control processor 196 may fully close the throttle valve 160 when starting the idle reduction control. In other words, the control processor 196 may fully close the throttle valve 160 before stopping the engine 110. Thereafter, when step S112 ends, the control processor 196 may cause the process to proceed to step S114.

In step S114, the control processor 196 may determine whether a condition for engine startup is satisfied. The control processor 196 may determine that the condition for engine startup is satisfied when the condition for execution of idle reduction becomes unsatisfied, such as when the brake pedal having been held down is released. If the control processor 196 determines that the condition for engine startup is unsatisfied (NO in step S114), the control processor 196 may repeat step S114 until the condition for engine startup is satisfied. When the condition for engine startup is satisfied (YES in step S114), the control processor 196 may cause the process to proceed to step S116.

In step S116, the calculator 194 may calculate the target internal pressure of the intake manifold 140, based on the voltage of the battery 130.

For example, the calculator 194 may calculate the frictional resistance of the engine 110 first, based on engine state data. The engine state data may be data on, for example, the temperature of the lubricating oil circulating through the engine 110, the temperature of the cooling water circulating through the engine 110, a temperature of the exhaust gas before the condition for execution of idle reduction is satisfied, and an accumulated amount of air from turning-on of the ignition to the stop of the engine 110. The engine state data may be acquired by the acquirer 192.

Thereafter, the calculator 194 may reference the target internal pressure data stored in the storage 198, and calculate the target internal pressure of the intake manifold 140, based on the calculated frictional resistance and a current voltage of the battery 130. The voltage of the battery 130 may be acquired by the acquirer 192. Thereafter, when step S116 ends, the control processor 196 may cause the process to proceed to step S118.

In step S118, the control processor 196 executes, during the execution of the idle reduction control and before cancelling the idle reduction control, the adjustment control of adjusting the internal pressure of the intake manifold 140 and causing the internal pressure of the intake manifold 140 to be lower as the voltage of the battery 130 is lower. In the example embodiment, the control processor 196 may control, for example, one or more of the throttle valve 160, the suction device 230, and the opening degree adjustment valve 240 to cause a detection value of the pressure sensor 142 to reach the target internal pressure calculated in step S116. The detection value of the pressure sensor 142 may be acquired by the acquirer 192.

In the adjustment control, the control processor 196 may adjust the internal pressure of the intake manifold 140 by controlling the opening degree of the throttle valve 160. For example, when the detection value of the pressure sensor 142 is lower than the target internal pressure, that is, when an actual internal pressure of the intake manifold 140 is lower than the target internal pressure, the amount of air in a combustion chamber of the engine 110 can run short to make it difficult to start up the engine 110. To address this, when the detection value of the pressure sensor 142 is lower than the target internal pressure, the control processor 196 may increase the internal pressure of the intake manifold 140 to the target internal pressure by increasing the opening degree of the throttle valve 160. This allows air to be supplied from the intake flow passage 150 to the intake manifold 140 through the throttle valve 160, and thus helps to increase the internal pressure of the intake manifold 140.

In some embodiments, in the adjustment control, the control processor 196 may adjust the internal pressure of the intake manifold 140 by controlling an opening degree of the opening degree adjustment valve 240 of the evaporative fuel processor 200. For example, when the detection value of the pressure sensor 142 is lower than the target internal pressure, the control processor 196 may increase the internal pressure of the intake manifold 140 to the target internal pressure by increasing the opening degree of the opening degree adjustment valve 240 of the evaporative fuel processor 200. Because a pressure of the first flow passage 210 of the evaporative fuel processor 200 is atmospheric pressure, opening the opening degree adjustment valve 240 allows air to be supplied from the first flow passage 210 to the intake manifold 140. Accordingly, increasing the opening degree of the opening degree adjustment valve 240 allows air to be supplied from the canister 220 to the intake manifold 140, and thus helps to increase the internal pressure of the intake manifold 140. In this case, the control processor 196 may control opening and closing of the opening degree adjustment valve 240, based on a concentration of the fuel gas in the canister 220. For example, when the concentration of the fuel gas in the canister 220 is higher than or equal to a concentration threshold, the control processor 196 may refrain from opening the opening degree adjustment valve 240 even if the detection value of the pressure sensor 142 is lower than the target internal pressure. The concentration threshold may be a concentration of the fuel gas in the canister 220 at which, for example, misfire would be caused in the engine 110 by the fuel gas supplied from the canister 220 to the engine 110 when the opening degree adjustment valve 240 is opened. In this case, the control processor 196 may increase the internal pressure of the intake manifold 140 to the target internal pressure by increasing the opening degree of the throttle valve 160.

In some embodiments, in the adjustment control, the control processor 196 may adjust the internal pressure of the intake manifold 140 by controlling the suction device 230 of the evaporative fuel processor 200. For example, when the detection value of the pressure sensor 142 is higher than the target internal pressure, the control processor 196 may reduce the internal pressure of the intake manifold 140 to the target internal pressure by driving the suction device 230 of the evaporative fuel processor 200. In this case, the control processor 196 may open the opening degree adjustment valve 240. This allows air in the intake manifold 140 to be suctioned into the canister 220.

Thus, when the internal pressure of the intake manifold 140 is higher than the target internal pressure, the control processor 196 may reduce the internal pressure of the intake manifold 140 toward the target internal pressure. When the internal pressure of the intake manifold 140 is lower than the target internal pressure, the control processor 196 may increase the internal pressure of the intake manifold 140 toward the target internal pressure. Thereafter, when step S118 ends, the control processor 196 may cause the process to proceed to step S120.

In step S120, the control processor 196 may cancel the idle reduction control. In the example embodiment, the control processor 196 may start up the engine 110 by driving the starter motor 120. The idle reduction control may thereby be cancelled, and the control processor 196 may end the idle reduction process.

3. Effects of Vehicle

Some effects of the vehicle 100 according to the example embodiment of the disclosure will now be described.

The vehicle 100 according to the example embodiment includes the engine 110, the intake manifold 140, the starter motor 120, the battery 130, and the control apparatus 190. The intake manifold 140 is coupled to the engine 110. The starter motor 120 starts up the engine 110. The battery 130 drives the starter motor 120. The control apparatus 190 includes the one or more processors **190*a*, and the one or more memories 190*b* coupled to the one or more processors 190*a*. The one or more processors 190*a* execute the idle reduction control, and execute, during the execution of the idle reduction control and before cancelling the idle reduction control, the adjustment control of adjusting the internal pressure of the intake manifold 140 and causing the internal pressure of the intake manifold 140 to be lower as the voltage of the battery 130 is lower. Accordingly, when the voltage of the electric power supplied to the starter motor 120 is low due to, for example, deterioration of the battery 130, it is possible for the vehicle 100 according to the example embodiment to reduce the internal pressure of the intake manifold 140. By reducing the internal pressure of the intake manifold 140, the vehicle 100 according to the example embodiment makes it possible to reduce a pressure of the combustion chamber of the engine 110 in the compression stroke. By reducing the pressure of the combustion chamber of the engine 110, the vehicle 100 according to the example embodiment makes it possible to reduce the rotational resistance of the engine 110. Thus, in the vehicle 100 according to the example embodiment, cranking by the starter motor 120 is suitably executable even when the electric power supplied to the starter motor 120 is low in voltage. This helps to appropriately execute the startup of the engine 110** when cancelling the idle reduction control.

In some embodiments, the control processor 196 may fully close the throttle valve 160 when starting the idle reduction control. This makes it possible for the control processor 196 to reduce the amount of air in the intake manifold 140 during the execution of the idle reduction control. Accordingly, a further reduction in the internal pressure of the intake manifold 140 is achievable by the control processor 196.

In some embodiments, the vehicle 100 may include the intake flow passage 150 coupled to the intake manifold 140, and the throttle valve 160 provided in the intake flow passage 150. The one or more processors **190*a* may, in the adjustment control, adjust the internal pressure of the intake manifold 140 by controlling the opening degree of the throttle valve 160. This makes it possible for the vehicle 100 to increase the internal pressure of the intake manifold 140 through a simple process of controlling the opening degree of the throttle valve 160**.

In some embodiments, the vehicle 100 may include the first flow passage 210 communicating with the intake manifold 140 and including the canister 220, and the suction device 230 provided at the location, in the first flow passage 210, farther from the intake manifold 140 with respect to the canister 220. The suction device 230 may suction gas from the intake manifold 140 toward the first flow passage 210. The one or more processors **190*a* may, in the adjustment control, adjust the internal pressure of the intake manifold 140 by controlling the suction device 230. This makes it possible for the vehicle 100 to reduce the internal pressure of the intake manifold 140 through a simple process of controlling the suction device 230**.

In some embodiments, the vehicle 100 may include the first flow passage 210 communicating with the intake manifold 140 and including the canister 220, and the opening degree adjustment valve 240 provided at the location, in the first flow passage 210, closer to the intake manifold 140 with respect to the canister 220. The one or more processors **190*a* may, in the adjustment control, adjust the internal pressure of the intake manifold 140 by controlling the opening degree of the opening degree adjustment valve 240. This makes it possible for the vehicle 100 to increase the internal pressure of the intake manifold 140 through a simple process of controlling the opening degree of the opening degree adjustment valve 240**.

4. Modification Example

The configuration of the vehicle 100 has been described above with reference to FIG. 1. However, the vehicle according to any embodiment of the disclosure may have a configuration other than the configuration illustrated in FIG. 1. In some embodiments, the vehicle may have a configuration in which any of components of the vehicle 100 illustrated in FIG. 1 is eliminated, changed, and/or any other component may be added to the components of the vehicle 100 illustrated in FIG. 1. In some embodiments, the vehicle may have a configuration illustrated in FIG. 4.

Figure 4:
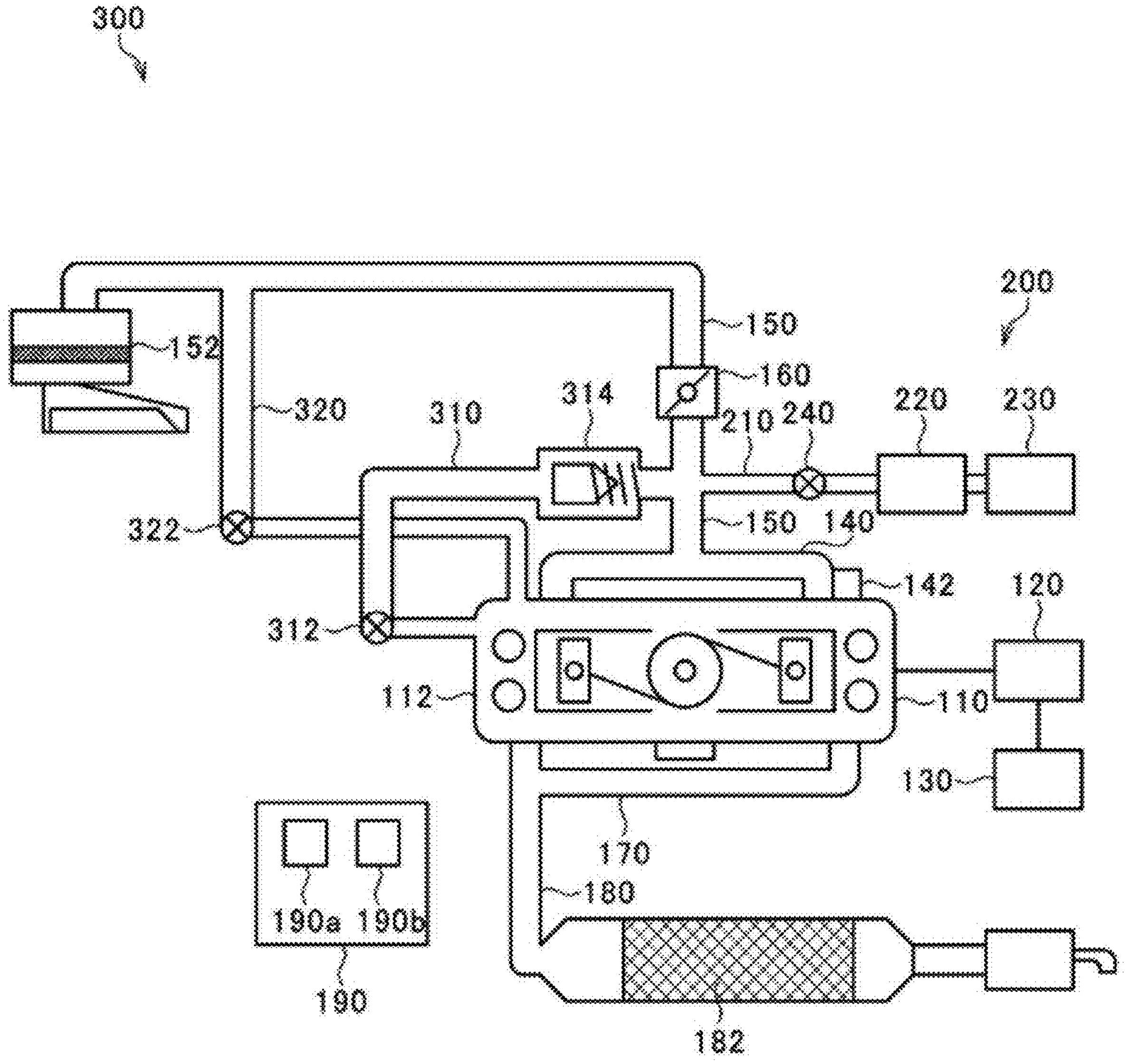
FIG. 4 is a schematic diagram illustrating an outline configuration of a vehicle according to a modification example.

FIG. 4 is a schematic diagram illustrating an outline configuration of a vehicle 300 according to a modification example. As illustrated in FIG. 4, the vehicle 300 may differ from the vehicle 100 described above in that a second flow passage 310, a flow rate adjustment valve 312, a second flow passage 320, and a flow rate adjustment valve 322 are further provided. Components substantially the same as those of the vehicle 100 described above are denoted with the same reference numerals to avoid any redundant description.

As illustrated in FIG. 4, the second flow passages 310 and 320 may allow a crankcase 112 of the engine 110 and the intake flow passage 150 to communicate with each other. Here, unburned gas or burned gas can sometimes leak from a piston-to-cylinder clearance of the engine 110 into the crankcase 112. The gas having leaked into the crankcase 112 may be called a blow-by gas. In the vehicle 300 according to the modification example, the blow-by gas having leaked into the crankcase 112 may be allowed to flow back from the crankcase 112 to the intake flow passage 150 via the second flow passages 310 and 320.

The second flow passage 310 may be coupled to the intake flow passage 150 at a location downstream of the throttle valve 160. In the following description, a region in the second flow passage 310 closer to the crankcase 112 will be referred to as an upstream side of the second flow passage 310, and a region in the second flow passage 310 closer to the intake flow passage 150 will be referred to as a downstream side of the second flow passage 310.

The second flow passage 310 may be provided with the flow rate adjustment valve 312 and a check valve 314 that are disposed in this order from the upstream side of the second flow passage 310. A change of an opening degree of the flow rate adjustment valve 312 may change a blow-by flow rate of the second flow passage 310, that is, a flow rate of the blow-by gas flowing through the second flow passage 310. The check valve 314 may permit a flow of gas from the second flow passage 310 toward the intake flow passage 150 and limit a flow of gas from intake flow passage 150 toward the second flow passage 310. Accordingly, when a pressure of the second flow passage 310 is higher than a pressure of the intake flow passage 150, the blow-by gas may flow back from the crankcase 112 to the intake flow passage 150 via the second flow passage 310. In contrast, when the pressure of the intake flow passage 150 is higher than the pressure of the second flow passage 310, backflow of the intake air from the intake flow passage 150 to the second flow passage 310 may be prevented.

The second flow passage 320 may be coupled to the intake flow passage 150 at a location that is downstream of the air cleaner 152 and upstream of the throttle valve 160.

The second flow passage 320 may be provided with the flow rate adjustment valve 322. A change of an opening degree of the flow rate adjustment valve 322 may change a blow-by flow rate of the second flow passage 320, that is, a flow rate of the blow-by gas flowing through the second flow passage 320.

In the modification example, the control processor 196 may, in step S112, for example, fully close the throttle valve 160 and fully close the flow rate adjustment valves 312 and 322 when starting the idle reduction control. In other words, in the modification example, the control processor 196 may fully close the flow rate adjustment valves 312 and 322, as well as the throttle valve 160, before stopping the engine 110. This helps to allow the control processor 196 of the modification example to prevent air from being supplied from the intake flow passage 150 to the intake manifold 140 through the second flow passage 320, the crankcase 112, and the second flow passage 310 during the execution of the idle reduction control. Accordingly, in the vehicle 300 according to the modification example, cranking by the starter motor 120 is suitably executable even when the electric power supplied to the starter motor 120 is low in voltage. This helps to appropriately execute the startup of the engine 110 when cancelling the idle reduction control.

In the modification example, the one or more processors 190*a* may, in the adjustment control, adjust the internal pressure of the crankcase 112 by controlling the flow rate adjustment valves 312 and 322, in addition to adjusting the internal pressure of the intake manifold 140. For example, in the adjustment control, the one or more processors 190*a* may increase the internal pressure of the intake manifold 140 to the target internal pressure by increasing the opening degree of each of the flow rate adjustment valves 312 and 322, in addition to adjusting the internal pressure of the intake manifold 140. This allows air to be supplied from the intake flow passage 150 to the intake manifold 140 through the second flow passage 320, the crankcase 112, and the second flow passage 310, and thus helps to increase the internal pressure of the intake manifold 140.

The vehicle 300 according to the modification example thus makes it possible to increase the internal pressure of the intake manifold 140 through a simple process of controlling the opening degree of each of the flow rate adjustment valves 312 and 322.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, the processes described with reference to the flowcharts according to an example embodiment described above do not necessarily have to be executed in the order illustrated in the flowcharts. In some embodiments, the flowcharts described above each may have an additional process step. In some embodiments, a part of the process steps may be eliminated from each of the flowcharts described above.

In the example embodiment and the modification example, an example is given where the vehicles 100 and 300 each include the pressure sensor 142 that detects the internal pressure of the intake manifold 140. However, as long as it is possible to acquire data on the internal pressure of the intake manifold 140, the vehicles 100 and 300 each do not have to include the pressure sensor 142. In some embodiments, the vehicles 100 and 300 may each estimate the internal pressure of the intake manifold 140, based on a measurement value of a pressure sensor provided in the suction device 230 by opening the opening degree adjustment valve 240.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims.

The limitations in the claims are to be interpreted broadly based on the language employed in the claims and not limited to examples described in this specification or during the prosecution of the application, and the examples are to be construed as non-exclusive.

As used in this specification and the appended claims, the singular forms “a”, “an”, and “the” include, especially in the context of the claims, are to be construed to cover both the singular and the plural, unless otherwise indicated herein or clearly contradicted by context.

Throughout this specification and the appended claims, unless the context requires otherwise, the terms “comprise”, “include”, “have”, and their variations are to be construed to cover the inclusion of a stated element, integer, or step but not the exclusion of any other non-stated element, integer, or step.

The use of the terms first, second, etc. does not denote any order or importance, but rather the terms first, second, etc. are used to distinguish one element from another.

The term “substantially”, “approximately”, “about”, and its variants having a similar meaning thereto are defined as being largely but not necessarily wholly what is specified as understood by one of ordinary skill in the art.

The term “disposed on/provided on/formed on” and its variants having a similar meaning thereto as used herein refer to elements disposed directly in contact with each other or indirectly by having intervening structures therebetween.

The control apparatus 190 illustrated in FIGS. 1, 2, and 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 190. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control apparatus 190 illustrated in FIGS. 1, 2, and 4.

The invention claimed is:

1. A vehicle comprising:
- an engine;
- an intake manifold coupled to the engine;
- a starter motor configured to start up the engine;
- a battery configured to drive the starter motor; and
- a control apparatus comprising
  - one or more processors, and
  - one or more memories coupled to the one or more processors, wherein
- the one or more processors are configured to
  - execute idle reduction control, and
  - execute, during execution of the idle reduction control and before cancelling the idle reduction control, adjustment control of adjusting an internal pressure of the intake manifold and causing the internal pressure of the intake manifold to be lower as a voltage of the battery is lower.

2. The vehicle according to claim 1, further comprising:
- an intake flow passage coupled to the intake manifold; and
- a throttle valve provided in the intake flow passage, wherein
- the one or more processors are configured to, in the adjustment control, adjust the internal pressure of the intake manifold by controlling an opening degree of the throttle valve.

3. The vehicle according to claim 2, further comprising:
- an intake flow passage coupled to the intake manifold;
- a second flow passage configured to allow a crankcase of the engine and the intake flow passage to communicate with each other; and
- a flow rate adjustment valve provided in the second flow passage, wherein
- the one or more processors are configured to, in the adjustment control, adjust an internal pressure of the crankcase by controlling the flow rate adjustment valve, in addition to adjusting the internal pressure of the intake manifold.

4. The vehicle according to claim 1, further comprising:
- a first flow passage communicating with the intake manifold and comprising a canister; and
- a suction device provided at a location, in the first flow passage, farther from the intake manifold with respect to the canister, the suction device being configured to suction gas from the intake manifold toward the first flow passage, wherein
- the one or more processors are configured to, in the adjustment control, adjust the internal pressure of the intake manifold by controlling the suction device.

5. The vehicle according to claim 4, further comprising:
- an intake flow passage coupled to the intake manifold;
- a second flow passage configured to allow a crankcase of the engine and the intake flow passage to communicate with each other; and
- a flow rate adjustment valve provided in the second flow passage, wherein
- the one or more processors are configured to, in the adjustment control, adjust an internal pressure of the crankcase by controlling the flow rate adjustment valve, in addition to adjusting the internal pressure of the intake manifold.

6. The vehicle according to claim 1, further comprising:
- a first flow passage communicating with the intake manifold and comprising a canister; and
- an opening degree adjustment valve provided at a location, in the first flow passage, closer to the intake manifold with respect to the canister, wherein
- the one or more processors are configured to, in the adjustment control, adjust the internal pressure of the intake manifold by controlling an opening degree of the opening degree adjustment valve.

7. The vehicle according to claim 6, further comprising:
- an intake flow passage coupled to the intake manifold;
- a second flow passage configured to allow a crankcase of the engine and the intake flow passage to communicate with each other; and
- a flow rate adjustment valve provided in the second flow passage, wherein
- the one or more processors are configured to, in the adjustment control, adjust an internal pressure of the crankcase by controlling the flow rate adjustment valve, in addition to adjusting the internal pressure of the intake manifold.

8. The vehicle according to claim 1, further comprising:
- an intake flow passage coupled to the intake manifold;

a second flow passage configured to allow a crankcase of the engine and the intake flow passage to communicate with each other; and a flow rate adjustment valve provided in the second flow passage, wherein the one or more processors are configured to, in the adjustment control, adjust an internal pressure of the crankcase by controlling the flow rate adjustment valve, in addition to adjusting the internal pressure of the intake manifold.

* * * * *